US012080151B2

(12) United States Patent
Hwang et al.

(10) Patent No.: US 12,080,151 B2
(45) Date of Patent: Sep. 3, 2024

(54) DEVICE AND METHOD FOR TRANSMITTING MARITIME DISTRESS SIGNAL

(71) Applicant: BLAKSTONE CO.,LTD., Incheon (KR)

(72) Inventors: Cheong Ho Hwang, Bucheon-si (KR); Bong Gi Min, Gwangju-si (KR)

(73) Assignee: BLAKSTONE CO., LTD., Incheon (KR)

( * ) Notice: Subject to any disclaimer, the term of this patent is extended or adjusted under 35 U.S.C. 154(b) by 694 days.

(21) Appl. No.: 17/312,395

(22) PCT Filed: Nov. 22, 2019

(86) PCT No.: PCT/KR2019/016147
§ 371 (c)(1),
(2) Date: Jun. 10, 2021

(87) PCT Pub. No.: WO2020/122458
PCT Pub. Date: Jun. 18, 2020

(65) Prior Publication Data
US 2022/0020247 A1    Jan. 20, 2022

(30) Foreign Application Priority Data

Dec. 10, 2018    (KR) .................... 10-2018-0158280

(51) Int. Cl.
*G08B 5/00*       (2006.01)
*B63C 9/11*       (2006.01)
(Continued)

(52) U.S. Cl.
CPC ............... *G08B 5/002* (2013.01); *B63C 9/11* (2013.01); *B63C 9/20* (2013.01); *G08B 3/1033* (2013.01); *G08B 21/0269* (2013.01); *H04B 1/38* (2013.01)

(58) Field of Classification Search
CPC .. G08B 5/002; G08B 3/1033; G08B 21/0269; B63C 9/11; B63C 9/20; B63C 9/08; H04B 1/38; B63B 2201/20; B63B 2213/02
See application file for complete search history.

(56) References Cited

U.S. PATENT DOCUMENTS 4,079,364 A * 3/1978 Antenore ............. B63C 9/0005
441/89
5,520,486 A * 5/1996 Van Wyck ............. B63C 11/26
116/210
(Continued)

FOREIGN PATENT DOCUMENTS

JP         07-264661 A    10/1995
KR    10-2005-0081971 A     8/2005
(Continued)

OTHER PUBLICATIONS

KR-20200125530-A; Kang, "Apparatus for Position Tracking of Sufferer on the Sea", 2020. (Year: 2020).*
(Continued)

*Primary Examiner* — John Fitzgerald
*Assistant Examiner* — Tania Courson
(74) *Attorney, Agent, or Firm* — Revolution IP, PLLC

(57) ABSTRACT

The present invention relates to a maritime distress signal transmission device which transmits a distress signal to an arbitrary rescue station to rescue a person in distress by transmitting a distress signal of the person in distress at sea wearing a life jacket and precise location information based on the Global Positioning System (GPS) to the rescue station as audible sound, and the maritime distress signal transmission device includes a holder-cradle which is coupled to the life jacket of the person in distress by a clip and a main body which is coupled to the holder-cradle and transmits the
(Continued)

rescue signal to an arbitrary receiver using a preset frequency band.

12 Claims, 8 Drawing Sheets

(51) Int. Cl.
    *B63C 9/20*         (2006.01)
    *G08B 3/10*         (2006.01)
    *G08B 21/02*       (2006.01)
    *H04B 1/38*        (2015.01)

(56) References Cited

U.S. PATENT DOCUMENTS

| | | | | |
|---|---|---|---|---|
| 5,945,912 | A * | 8/1999 | Guldbrand | B63C 9/0005 |
| | | | | 116/210 |
| 6,439,941 | B2 * | 8/2002 | McClure | B63C 9/0005 |
| | | | | 441/89 |
| 7,053,822 | B2 * | 5/2006 | Rickerson, Jr. | B63C 9/20 |
| | | | | 342/357.54 |
| 8,998,666 | B1 * | 4/2015 | Albright | B63C 9/20 |
| | | | | 340/573.6 |
| 9,139,271 | B2 * | 9/2015 | Beach-Drummond | |
| | | | | B63C 9/1255 |
| 10,329,001 | B2 * | 6/2019 | Chen | B63C 9/0005 |
| 11,155,325 | B2 * | 10/2021 | Garner | B63C 9/1255 |
| 11,488,462 | B2 * | 11/2022 | Lim | G08B 21/088 |
| 11,830,337 | B2 * | 11/2023 | Yeon Lim | G08B 21/088 |
| 2005/0040987 | A1 * | 2/2005 | Bruno | G01S 5/0231 |
| | | | | 342/357.31 |
| 2014/0057510 | A1 | 2/2014 | Beach-Drummond | |

FOREIGN PATENT DOCUMENTS

KR    10-2012-0107764 A    10/2012
KR    10-2016-0038913 A    4/2016

OTHER PUBLICATIONS

International Search Report for PCT/KR2019/016147 mailed Mar. 23, 2020 from Korean Intellectual Property Office.

* cited by examiner (a)

(b)

DEVICE AND METHOD FOR TRANSMITTING MARITIME DISTRESS SIGNAL

CROSS REFERENCE TO PRIOR APPLICATIONS

This application is the 35 U.S.C. 371 national stage of International application PCT/KR2019/016147 filed on Nov. 22, 2019; which claims priority to Korean Patent Application No. 10-2018-0158280 filed on Dec. 10, 2018. The entire contents of each of the above-identified applications are hereby incorporated by reference.

TECHNICAL FIELD

The present invention relates to a maritime distress signal transmission device which transmits a distress signal of a person in maritime distress wearing a life jacket to a rescue station to rescue the person in maritime distress.

BACKGROUND ART

Generally, life jackets are rescue devices for safely rescuing passengers in maritime accidents in rivers, lakes, and seas, and such a life jacket provides a certain amount of buoyancy to the passenger on board a ship or the like to allow the passenger to wait for rescue while floating on a water surface.

Recently, since maritime accidents occur frequently, not only the life jacket but also a life jacket having a function of identifying a position of a person in distress is being developed. As described above, in the case of distress on a sea or river surface, a distress signal generator in a form of being attached to a life jacket, which may be manipulated by a person in distress to transmit a rescue signal, is mainly used, wherein the distress signal generator receives satellite signals from Global Positioning System (GPS) satellites and the person in distress transmits digital data including coordinates, an identification (ID) of the person in distress, and the like to digital signal receivers installed in Coast Guard stations, base stations, various ships, and the like.

However, since the maritime accident may cause various secondary accidents, such as hypothermia occurring when floating in the sea and an injury due to external impact, even when the life jacket is being worn, a situation in which the person in distress cannot directly request rescue can occur quite frequently.

For example, there may be people in distress who are unfamiliar with operation of electronic devices, who lost consciousness due to impact when escaping from ships, who escape in near critical states, and the like.

In addition, in a case in which a person in distress dies due to various reasons, a case in which the person in distress drifts and disappears even when wearing a life jacket occurs many times.

As described above, in the case in which the person in distress cannot directly request rescue or dies due to various reasons, it is difficult to identify a location of the person in distress.

Particularly, although there are many cases in which families of missing persons who have drifted away want to know whether people in distress are alive or dead, it is not easy to find the missing persons in the vast sea.

In addition, among distress signal generators attached to life jackets, a passive distress signal generator detachably attached to a life jacket has a structure which may be submerged below a water surface according to a weight of a person in distress, a position at which the passive distress signal generator is attached to the life jacket, or the like when a person enters the water, and when the distress signal generator is submerged below the water surface to a certain depth, a problem occurs in that communication sensitivity of satellite signals and distress signals are lowered.

Particularly, in a case in which a person in distress is in an unconscious state, since it is impossible for the person in distress to directly separate a distress signal generator from a life jacket to turn the distress signal generator on, the value of a rescue device becomes meaningless.

Accordingly, a distress signal transmission device installed on a life jacket should detect distress even when a person in distress does not manipulate the distress signal transmission device and automatically operate to transmit a distress signal to a rescue station, and to this end, a technical solution by which the distress signal transmission device is not submerged below a water surface and floats on the water surface is required.

In addition, a technical solution is required in which a software control method suitably designed in consideration of the time taken for a person in distress to be rescued or found should be applied to continuously and automatically transmit a rescue signal, and a limited battery lifetime should be increased, or power consumption is reduced.

In addition, since a distress signal transmission device includes a wireless transmitter, an antenna is needed, the antenna should have a suitable shape or size and should not be cumbersome such that the distress signal transmitter does not have a protruding portion toward the outside due to the antenna in a state in which the distress signal transmission device is coupled to a life jacket in a state in which the life jacket is not in the water, and to this end, a technical solution is required in which the antenna is hidden in the transmission device and then spreads out or protrudes at the same time when entering the water.

TECHNICAL PROBLEM

The present invention is directed to providing a maritime distress signal transmission device which determines entry into water and transmits a distress signal regardless of whether a person in distress is conscious or not.

In addition, the present invention is directed to providing a maritime distress signal transmission device which receives a position of a person in distress from satellites and floats on a water surface instead of falling below the water surface in order to prevent communication sensitivity for transmitting a distress signal from being lowered and a transmission method.

In addition, the present invention is directed to providing a maritime distress signal transmission device which remains in a dormant state for a minimum of five years while using minimum power, then, automatically starts operation after entering the water with a person in distress due to a maritime distress accident and the like, and transmits location information of the person in distress to a fishing vessel or rescue station located nearby for a maximum time, and a transmission method.

In addition, the present invention is directed to providing a maritime distress signal transmission device including a high-brightness light emitting part allowing a location of a person in distress to be easily identified from the sky or surrounding area when it is dark and a transmission method.

The technical objectives to be solved by the present invention are not limited to the technical objectives described above, and other technical objectives which are not described will be clearly understood by those skilled in the art through the following description.

TECHNICAL SOLUTION

One aspect of the present invention provides a maritime distress signal transmission device including a holder-cradle coupled to a life jacket of a person in distress, and a main body which is coupled to the holder-cradle and transmits a rescue signal to an arbitrary receiver using a preset frequency band, wherein the main body includes a main body housing which includes a moisture sensor disposed on a rear surface thereof and configured to detect entry into water and in which a Global Positioning System (GPS) receiver configured to receive GPS signals, a time to speech (TTS) signal convertor configured to convert the GPS signals to a TTS voice signal, and a wireless transmitter configured to transmit the TTS voice signal to an arbitrary wireless network are accommodated in an accommodation part, a main body cover which covers an upper surface of the main body housing to perform a waterproofing function to prevent water from being introduced thereinto and accommodates an antenna which is disposed on an upper surface and transmits the TTS voice signal through a preset frequency band, and an antenna cover which hides and protects the antenna accommodated in the main body cover and in which a first hooking hole is formed in a direction perpendicular to an extension part formed by extending one side of the antenna cover, the holder-cradle allows the main body to be seated thereon and includes a second hooking hole is formed upward at one side thereof, a separation part having a double coupling part in which a first hooking part to which the first hooking hole of the antenna cover is coupled, a second hooking part to which the second hooking hole of the holder-cradle is coupled, and a rack gear rail which is moved in one direction by operation of a pinion gear connected to a motor provided in the accommodation part of the main body housing are formed and which is moved in the one direction according to operation of the rack gear to separate the holder-cradle and the antenna cover is provided, the holder-cradle and the antenna cover, which are coupled to the double coupling part, are sequentially separated according to detection of the moisture sensor to float the main body on a water surface, and the TTS voice signal is wirelessly transmitted as a signal in a preset frequency band to an arbitrary remote receiver through the antenna protruding upward due to the separation of the antenna cover.

The moisture sensor may be arranged as a plurality of moisture sensors, and the entry into water may be detected through an abnormal signal which is generated for a preset time period or more.

The holder-cradle and the main body may be connected by a wire, and even when the double coupling part and the second hooking hole of the holder-cradle are separated, the main body may be located near the holder-cradle located with the person in distress in a state in which the connection of the wire is maintained.

In order for the main body to float on the water surface, a buoyancy member may be provided in the accommodation part of the main body housing or on each of left and right side surfaces of the main body housing.

An elastic member, which allows the main body and holder-cradle to push against each other so that the main body and holder-cradle are easily separated from each other, may be provided on the rear surface of the main body housing or on an upper surface of the holder-cradle.

The TTS signal convertor may combine pre-registered digital syllable information according to the received GPS signals to convert the digital syllable information to the TTS voice signal.

The wireless transmitter may transmit the TTS voice signal converted by the TTS signal convertor to a remote receiver using the same wireless frequency.

The TTS voice signal may include any one or more among emergency situation information, a position of the person in distress, a movement speed of the person in distress, a movement direction, a distress occurrence time, and water temperature information.

In the separation part, an elastic cover formed of a urethane material or the like to prevent water from being introduced into the main body housing through a through hole, through which the rack gear rail moves, of the main body housing may be further provided, the rack gear rail and the double coupling part may be coupled with the elastic cover interposed therebetween, and the double coupling part may be moved while the elastic cover is stretched according to the movement of the rack gear rail.

The main body cover may further include a brightness sensor which detects brightness, and a high-brightness light emitting part which emits light according to the brightness sensor.

Another aspect of the present invention provides a method of transmitting a maritime distress signal, which is performed by a device including a holder-cradle coupled to a life jacket of a person in distress and a main body which is coupled to the holder-cradle and transmits a rescue signal to an arbitrary receiver using a preset frequency band, the method including (a) detecting, by a moisture sensor of the main body, entry into water, (b) separating, by driving a motor, the main body from the holder-cradle when entry into water is detected, (c) opening an antenna cover which hides an antenna to activate the antenna, which has been hidden, using the motor when the main body is separated, (d) receiving Global Positioning System (GPS) information through a GPS antenna of a GPS receiver when the antenna is activated, (e) combining digital syllable information according to the GPS information to convert to a TTS voice signal, and (f) transmitting the TTS voice signal through a wireless transmitter using the preset frequency band to the arbitrary remote receiver using the same frequency band as the wireless transmitter.

Specifically, in operation (a), the entry into water may be determined according to the occurrence of a change in voltage of a drain of a component due to a change in voltage of a gate due to moisture, wherein electrodes, which are in pairs of two electrodes, may be connected to the gate of a high-impedance field effect transistor in order to easily detect sea water and fresh water, and the entry into water may be determined by determining whether the number of electrodes having changed voltage values is maintained for a predetermined period according to a reference of a preset number of electrodes.

Operations (b) and (c) may be performed by one motor; and the holder-cradle and the antenna cover may be sequentially separated or be separated at the same time according to a movement distance of a rack gear rail coupled to a pinion gear, which is rotated by driving of the motor, and moved in one direction by operation of the pinion gear.

In operation (f), the receiver may be essentially installed or located in each of all nearby vessels, base stations, and rescue stations according to an international standard for maritime rescue.

ADVANTAGEOUS EFFECTS

As described above, the present invention has an effect in that a maritime distress signal transmission device is automatically driven to transmit a rescue signal when detecting whether a person in distress has entered the water regardless of manual operation of the person in distress.

In addition, in the present invention, since a holder-cradle and an antenna cover are separated using one motor, there is an effect in that a size of the distress signal transmission device can be reduced, battery consumption can be reduced, and thus a rescue signal transmission time period can be increased.

In addition, in the present invention, since the holder-cradle and a main body are separated and the antenna cover is separated therefrom by a separation part, the main body floats on a water surface, an antenna is activated, and thus there is an effect in that communication sensitivity is improved.

In addition, in the present invention, since a rescue request signal for being rescued and a plurality of necessary signals mainly including precise location information based on Global Positioning System (GPS) satellites are converted to text to speech (TTS) syllable signals, the converted TTS syllable signals are transmitted to a receiver using a international standard frequency band for maritime emergency rescue, and thus there is an effect in that signal information can be clearly confirmed and a quick rescue can be achieved.

MODES OF THE INVENTION

Hereinafter, embodiments of the present invention will be described in detail with reference to the accompanying drawings.

In addition, sizes, shapes or the like of components illustrated in the accompanying drawings may be exaggerated for clarity and the sake of convenience in the description, terms specifically defined in consideration of configurations and functions of the present invention may vary according to a distressed person's or operator's intention or customs, and thus the definitions of the terms should be interpreted based on the contents throughout this specification.

FIGS. 1 to 7 are views illustrating a maritime distress signal transmission device according to an embodiment of the present invention, and the maritime distress signal transmission device includes a holder-cradle 100, a main body 200, and a separation part 300.

The holder-cradle 100 is coupled to a life jacket of a person in distress so that the main body 200 is seated and installed on the holder-cradle 100.

Figure 1:
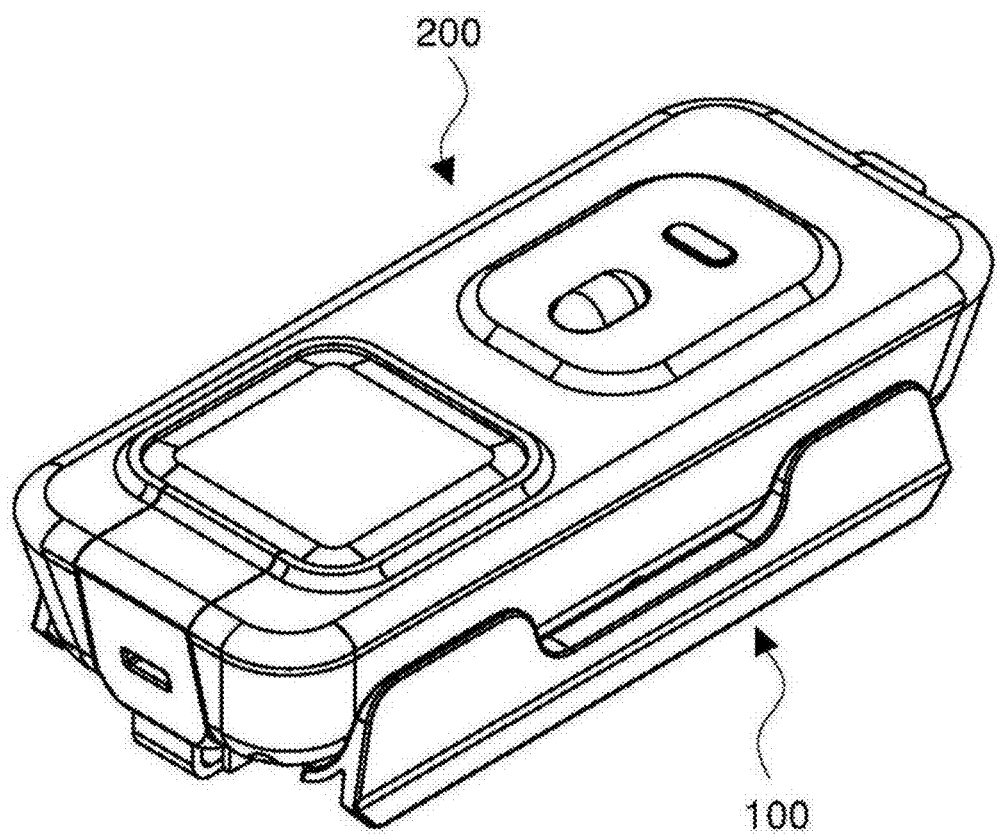
FIG. 1 is a perspective view illustrating a maritime distress signal transmission device according to an embodiment of the present invention.
Figure 2:
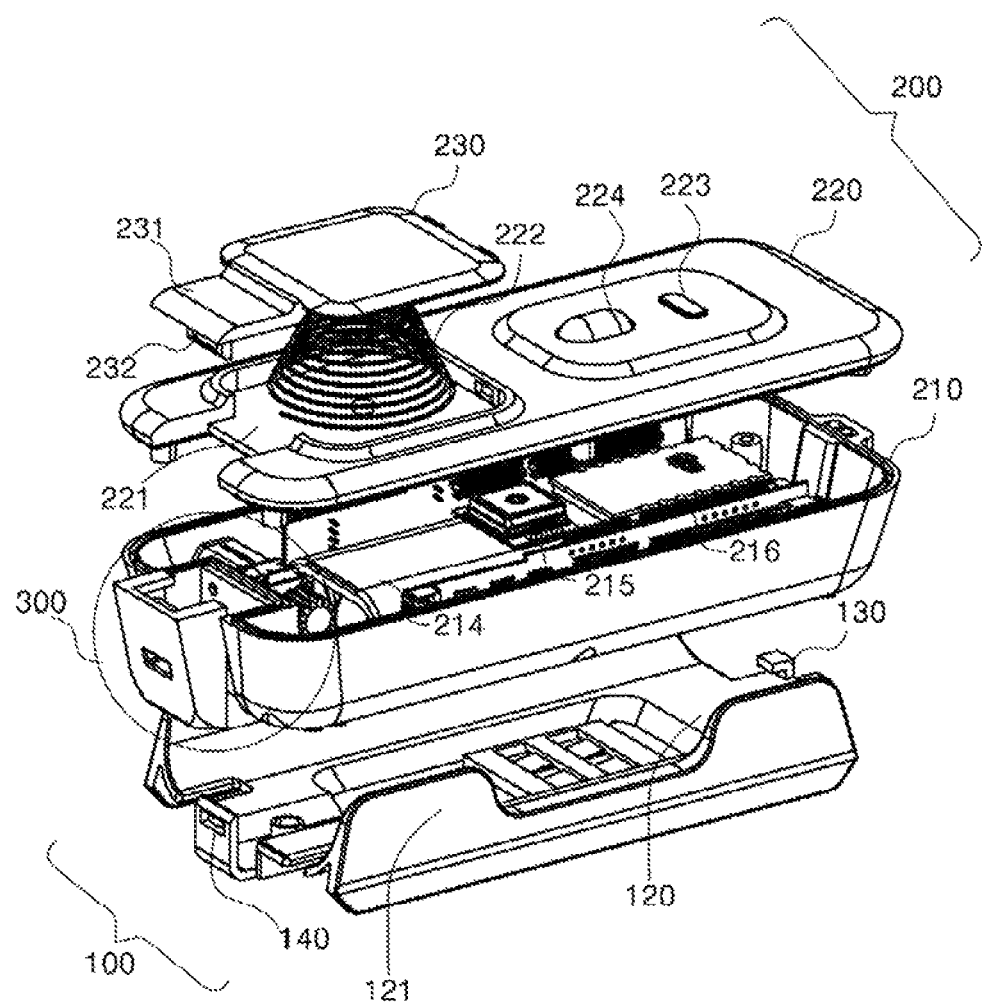
FIG. 2 is an exploded perspective view illustrating the maritime distress signal transmission device according to the embodiment of the present invention.
Figure 3:
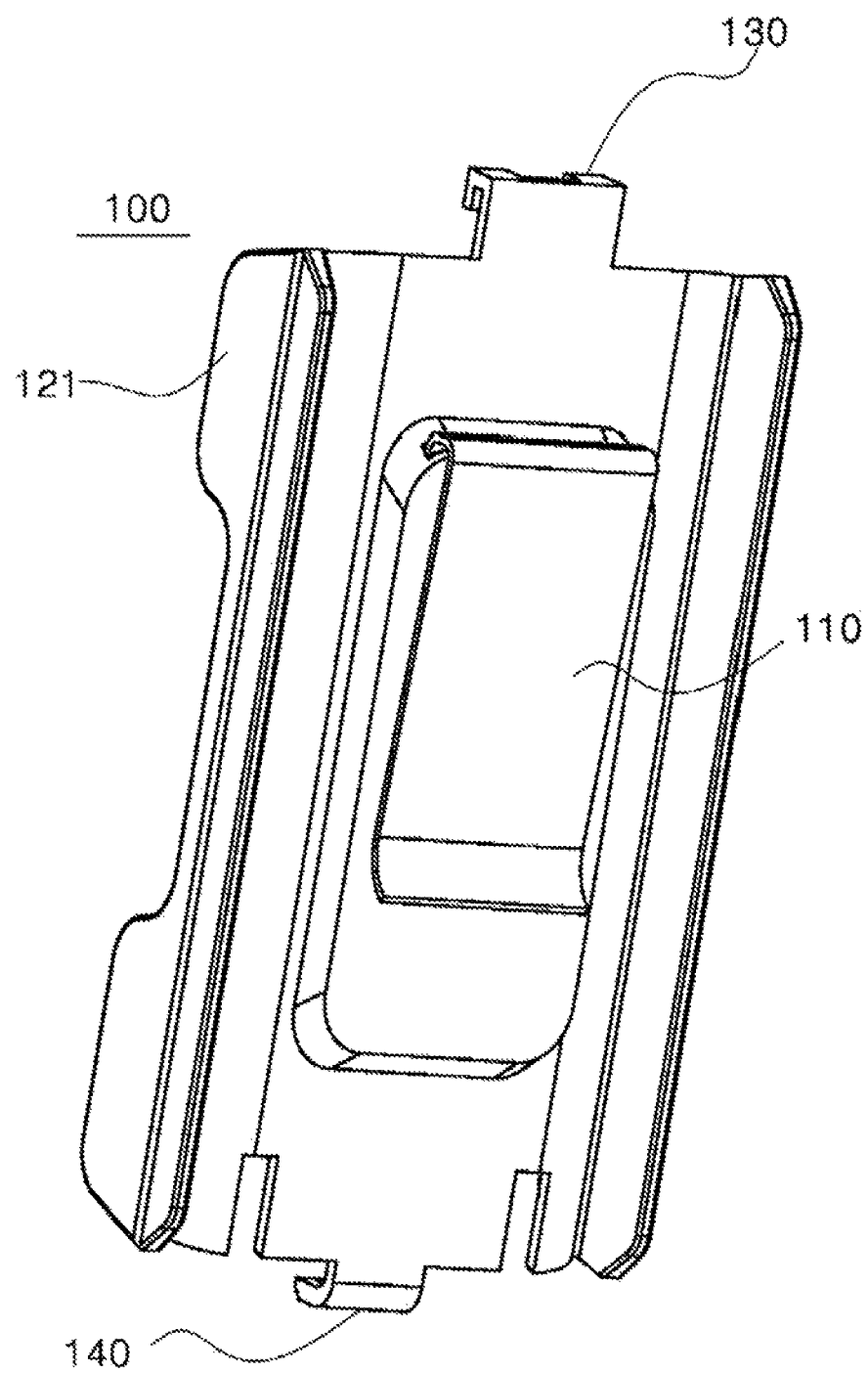
FIG. 3 is a view illustrating a rear surface of a holder-cradle of the maritime distress signal transmission device according to the embodiment of the present invention.

As illustrated in FIGS. 2 and 3, the holder-cradle 100 includes a fixing member 110 on a rear surface to be coupled to a metal clip provided on a belt of the lifejacket, and a main body seating portion 120 is formed so that the main body 200 is coupled to and seated on an upper surface of the holder-cradle 100.

A coupling part 130 and a second hooking hole 140, by which the main body 200 seated on the main body seating portion 120 of the holder-cradle 100 is insertion-coupled to the main body seating portion 120 without additional driving so that the main body 200 and the main body seating portion 120 of the holder-cradle 100 are not separated, are formed, and a guide part 121, which prevents separation of the main body 200 seated in a longitudinal direction at both sides of the main body seating portion 120 and guides the main body 200 insertion-coupled to the main body seating portion 120, is formed.

Figure 4:
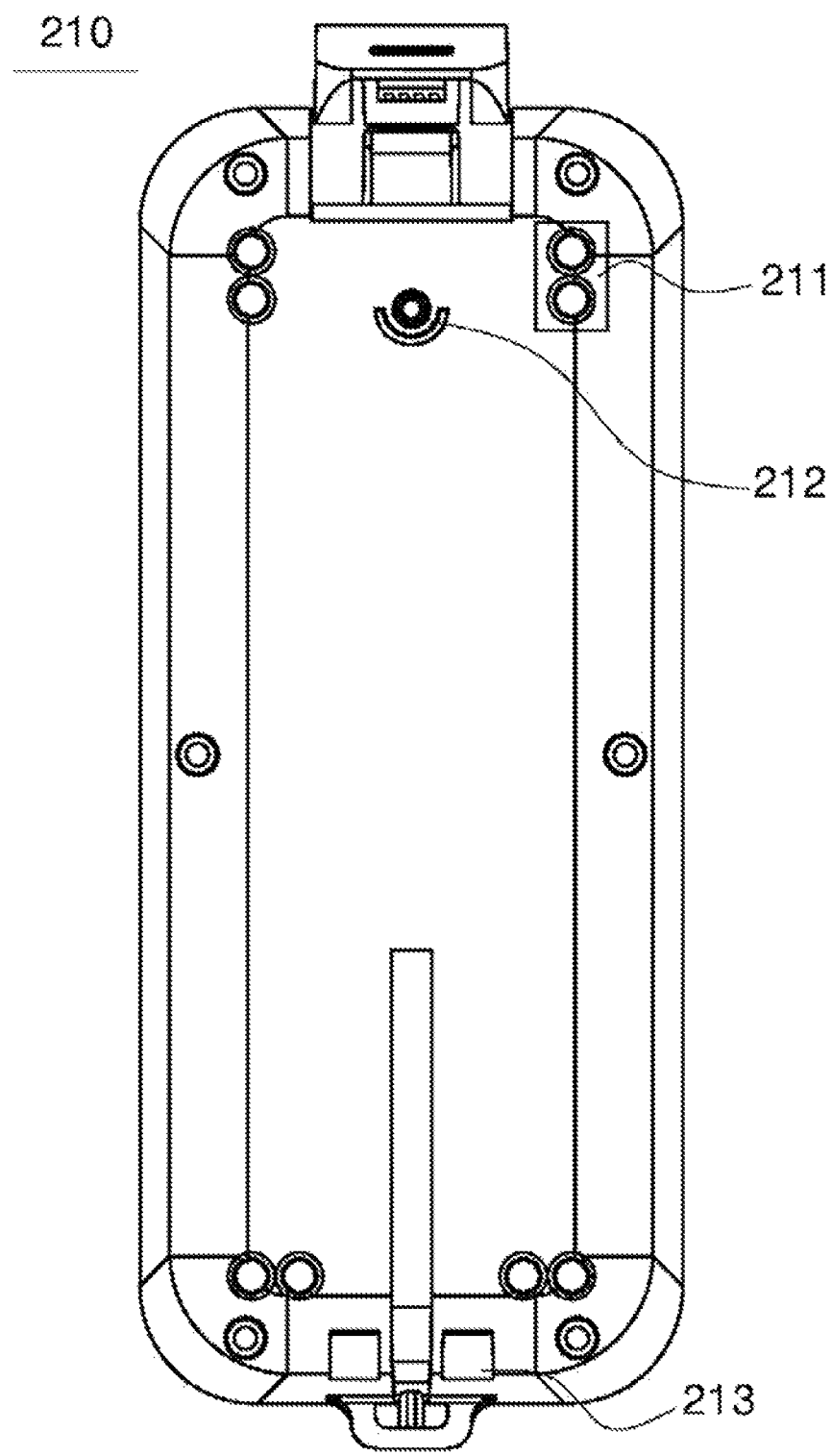
FIG. 4 is a view illustrating a rear surface of a main body of the maritime distress signal transmission device according to the embodiment of the present invention.

The main body 200 is seated on the main body seating portion 120 of the holder-cradle 100 and transmits a rescue signal to an arbitrary receiver (not shown) using a preset frequency band, and as illustrated in FIGS. 2 and 4, the main body 200 includes a main body housing 210, a main body cover 220, and an antenna cover 230.

The main body housing 210 includes a moisture sensor 211 which detects entry into water, a temperature sensor (not shown) which detects a water temperature, and an elastic member 212 which pushes the holder-cradle 100 out on a rear surface, and a battery 214, a Global Positioning System (GPS) receiver 215, a text to speech (TTS) signal convertor 216, a wireless transmitter (not shown), and a controller (not shown) are provided in an accommodation part on an upper surface of the main body housing 210.

The moisture sensor 211, which determines whether a person in distress has entered sea water, is provided as a sensor circuit including a field effect transistor having a high-impedance gate, and includes a plurality of electrodes which are in pairs of two opposite electrodes.

The elastic member 212, which is disposed on a rear surface of the main body 200 and has a force to push the holder-cradle 100 out, pushes the holder-cradle 100 out to easily separate the holder-cradle 100 from the main body 200 when the main body 200 is separated from the holder-cradle 100.

In the embodiment of the present invention, although the elastic member 212 is included in the main body 200, the elastic member is positioned on the main body seating portion 120 of the holder-cradle 100 to which the main body 200 is coupled.

The battery 214 provides power to components of the transmission device including the moisture sensor 211, and since the charging of the transmission device is impassible due to an environment in which the transmission device of the present invention is used and the transmission device should wait for a long time such as several years in an unused state, a primary battery having a property of an extremely low self-discharge rate is used as the battery 214.

The GPS receiver 215 receives GPS signals from satellites to determine a present position of the person in distress.

The TTS signal convertor 216, which converts the received GPS signals to a TTS voice signal, combines pre-registered digital syllable information according to the received GPS signals to convert the digital syllable information to the TTS voice signal.

More preferably, the TTS signal convertor 216 combines digital syllable information according to GPS longitude and latitude information included in the GPS signals received from the GPS receiver 215 to convert the digital syllable information to an audible TTS voice signal.

The wireless transmitter transmits the TTS voice signal to an arbitrary wireless network. Particularly, the wireless transmitter transmits the TTS voice signal converted by the TTS signal convertor to a remote receiver using a wireless frequency which is the same as that of the wireless transmitter.

The controller may control electronic components according to a received signal. For example, although operation of the separation part according to detection of the moisture sensor is controlled under control of the controller, since the components are directly and functionally described, the description of the controller will be omitted.

The main body cover 220 includes an antenna accommodation part 221 formed on an upper surface thereof and accommodating an antenna 222 and is provided with a brightness sensor 223 and a high-brightness light emitting part 224.

The antenna 222 transmits the converted TTS voice signal to a nearby fishing vessel or rescue station having a receiver using a preset frequency band. Particularly, the antenna 222 serves to receive a wireless signal transmitted as an audible sound signal which is TTS-converted by the TTS signal convertor 216 and to transmit the wireless signal in air.

The antenna may be accommodated in the antenna accommodation part 221 in an inactivated state before the moisture sensor 211 detects entering water.

The brightness sensor 223 detects surrounding brightness, and the high-brightness light emitting part 224 emits light according to the brightness to visually indicate a position of the person in distress even in a dark situation. That is, even when the position of the person in distress is identified by the rescue station and a rescuer is nearby or in the sky above person in distress, in a case in which the surroundings are dark, since it is difficult to find the person in distress immediately, location information is visually indicated for easy confirmation of the position of the person in distress even in a dark environment.

The antenna cover 230 covers the antenna accommodation part 221 to maintain an inactive state of the antenna 222 positioned in the antenna accommodation part 221 of the main body cover 220 and protect the antenna 222, one end of the antenna cover 230 is coupled to the main body cover 220 to cover the antenna accommodation part 221, the other end thereof forms an extension part 231 of which a part extends in the longitudinal direction, and a first hooking hole 232 is formed in a vertical or downward direction from the extension part 231.

Figure 5:
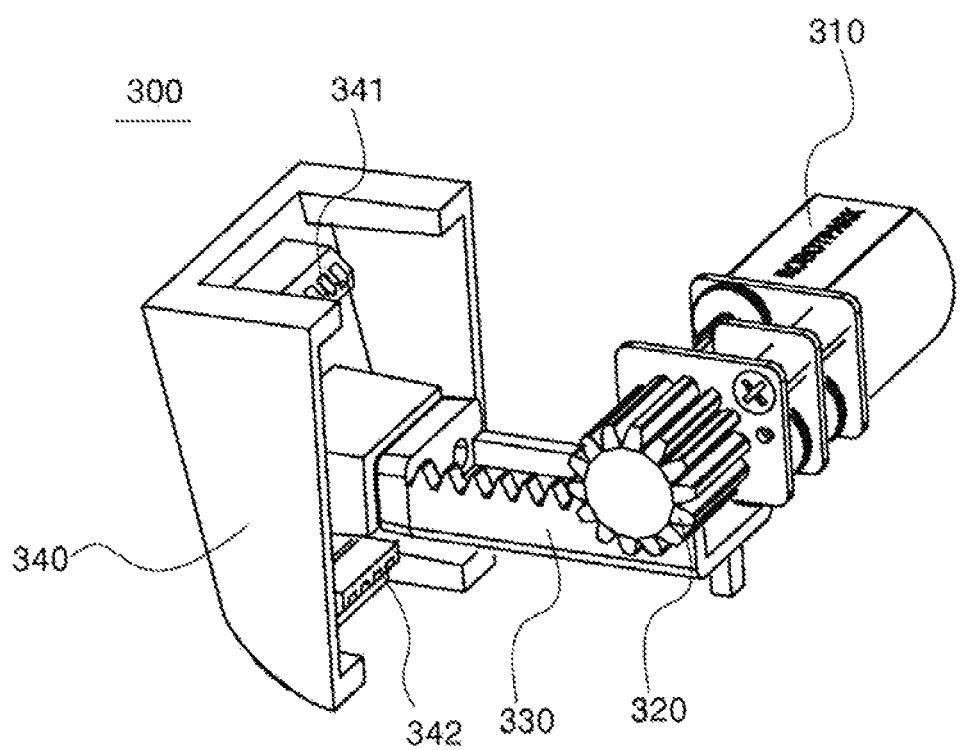
FIG. 5 is a view illustrating a separation part of the maritime distress signal transmission device according to the embodiment of the present invention.
Figure 6:
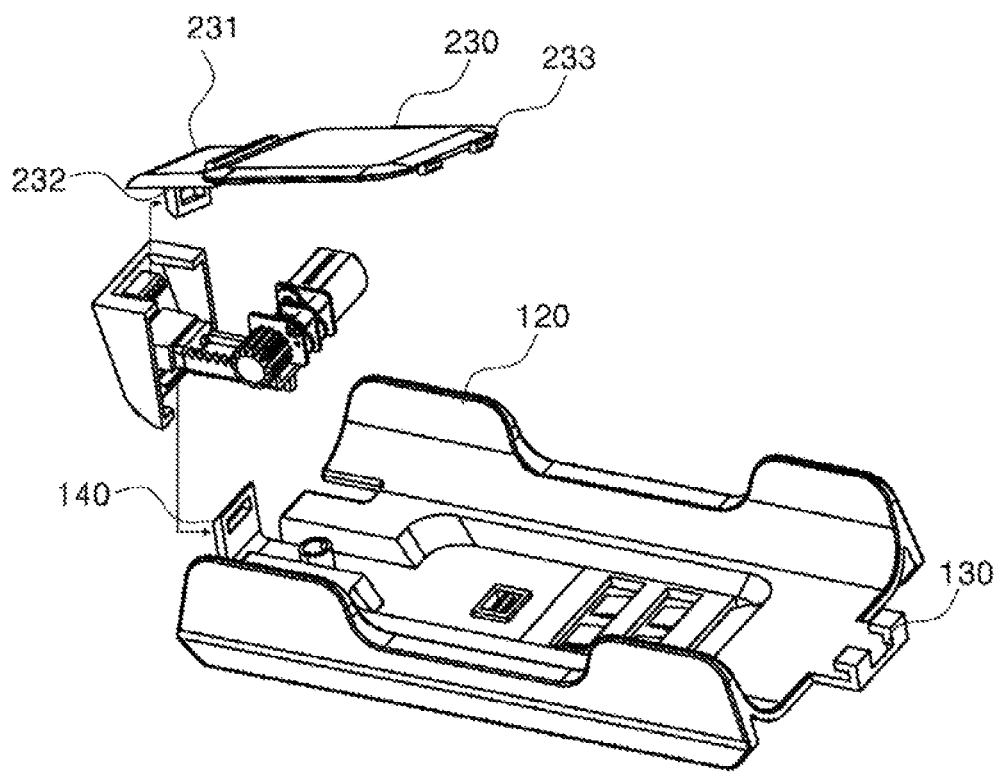
FIG. 6 is an exploded view illustrating a coupling form of the separation part of the maritime distress signal transmission device according to the embodiment of the present invention.
Figure 7:
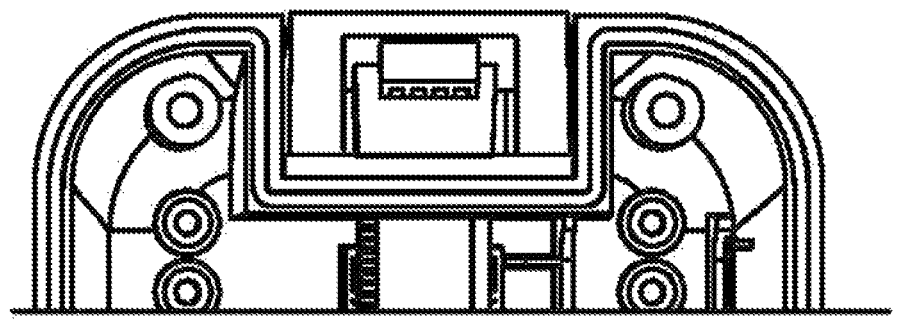
FIG. 7 is a set of views illustrating a movement form of the separation part of the maritime distress signal transmission device according to the embodiment of the present invention.
Figure 7:
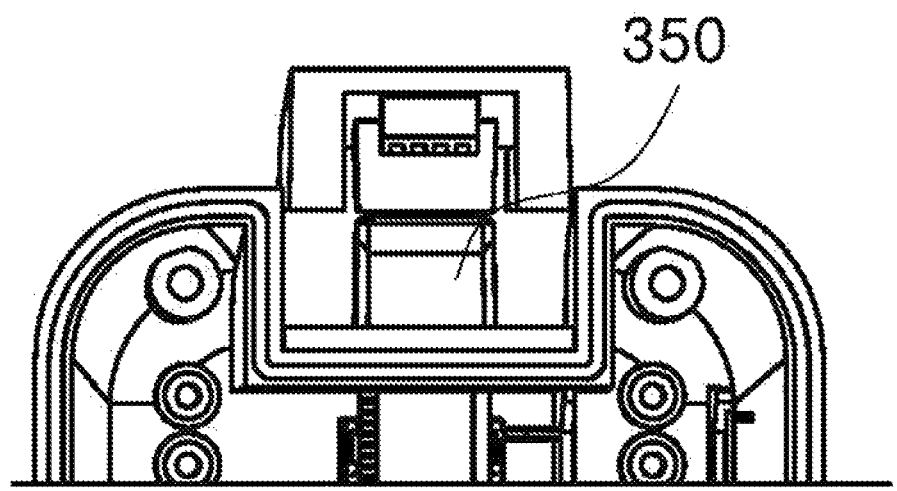

As illustrated in FIGS. 5 to 7, the separation part 300, which is coupled to the main body 200, separates the main body 200 from the holder-cradle 100 so that the main body floats upward on a water surface, and separates the antenna cover 230 to activate the hidden antenna 222.

In this case, the main body 200 separated by the separation part 300 is not submerged below the water surface and floats on the water surface while maintaining horizontality to improve communication sensitivity of the antenna 222 activated when the antenna cover 230 is separated.

Here, the separation part 300 includes a motor 310, a pinion gear 320, a rack gear rail 330, and a double coupling part 340. Although the motor 310, the pinion gear 320, and the rack gear rail 330 are positioned in the accommodation part of the main body housing 210, the motor 310, the pinion gear 320, and the rack gear rail 330 will be divided and described according to a technical feature.

The rack gear rail 330 of the separation part 300 is moved in one direction by the operation of the pinion gear 320 connected to the motor 310 provided in the accommodation part of the main body housing 210, a second hooking part 342 coupled to the second hooking hole 140 of the holder-cradle 100 and a first hooking part 341 coupled to the first hooking hole 232 of the antenna cover 230 are formed in the double coupling part 340, and thus the double coupling part 340 is moved in one direction with the rack gear rail 330 according to the operation of the rack gear rail 330.

In addition, as illustrated in FIG. 7, the separation part 300 includes an elastic cover 350 to prevent water from being introduced into the main body housing 210 through a through hole (not shown), through which the rack gear rail 330 moves, of the main body housing 210, the rack gear rail 330 and the double coupling part 340 are coupled with the elastic cover 350 interposed therebetween, and the double coupling part 340 moves outward while the elastic cover 350 is stretched according to movement of the rack gear rail 330.

That is, according to the movement of the rack gear rail 330, the holder-cradle 100 and the antenna cover 230 which are coupled to the double coupling part 340 are separated from the main body 200.

More preferably, the first hooking part 341 and the second hooking part 342 protrude inward, and in a coupled state in which the protruding second hooking part 342 is inserted into the second hooking hole 140 formed in the holder-cradle 100 and the first hooking part 341 is inserted into the first hooking hole 232 formed in the antenna cover 230, while the rack gear rail 330 is pushed outward, the first hooking part 341 and the second hooking part 342, which protrude, are moved outward and separated from the second hooking hole 140 of the holder-cradle 100 and the first hooking hole 232 of the antenna cover 230.

A structure and a coupling relationship of the maritime distress signal transmission device according to the embodiment of the present invention will be described below.

The holder-cradle 100 includes the fixing member 110 coupled to the life jacket on the rear surface, the guide part 121 is formed at both sides of the upper surface of the holder-cradle 100 in the longitudinal direction, and thus separation of the main body 200 seated on the upper surface is prevented.

In addition, the coupling part 130 coupled to a coupling groove 213 formed in one end of the main body housing 210 is formed at one end of the holder-cradle 100, one end of the holder-cradle 100 is coupled to the main body housing 210, the second hooking hole 140 is formed at the other end, and coupled to the second hooking part 342 formed in the double coupling part 340 of the separation part 300, and thus the main body 200 is seated on the holder-cradle 100.

In addition, the main body cover 220 is formed in a shape that matches a shape of the upper surface of the main body housing 210 to cover an upper end of the main body housing 210 and to be insertion-coupled to the upper surface of the main body housing 210, and the main body cover 220 and the main body housing 210 may not be separated.

In this case, a component, which generates a distress signal, is provided in the accommodation part of the main body housing 210, and since a full waterproof function is required according to an objective of being used on a sea water or fresh water surface, a full waterproof state is achieved through a Teflon seal and the like to prevent water from being introduced thereinto.

A coupling part 233 coupled to the upper surface of the main body cover 220 is formed at an one end of the antenna cover 230 which covers the antenna accommodation part 221 formed on an upper end of the main body cover 220, the one end of the antenna cover 230 is coupled to the main body cover 220, the first hooking hole 232 is formed at the other end, and the other end is coupled to the first hooking part 341 formed in the double coupling part 340 of the separation part 300.

More preferably, the first hooking hole 232 of the antenna cover 230 is formed in the downward or vertical direction from the extension part 231 extending to pass through the main body cover 220, and the second hooking hole 140 of the holder-cradle 100 is formed in an upward or vertical direction to pass through the main body housing 210.

Figure 8:
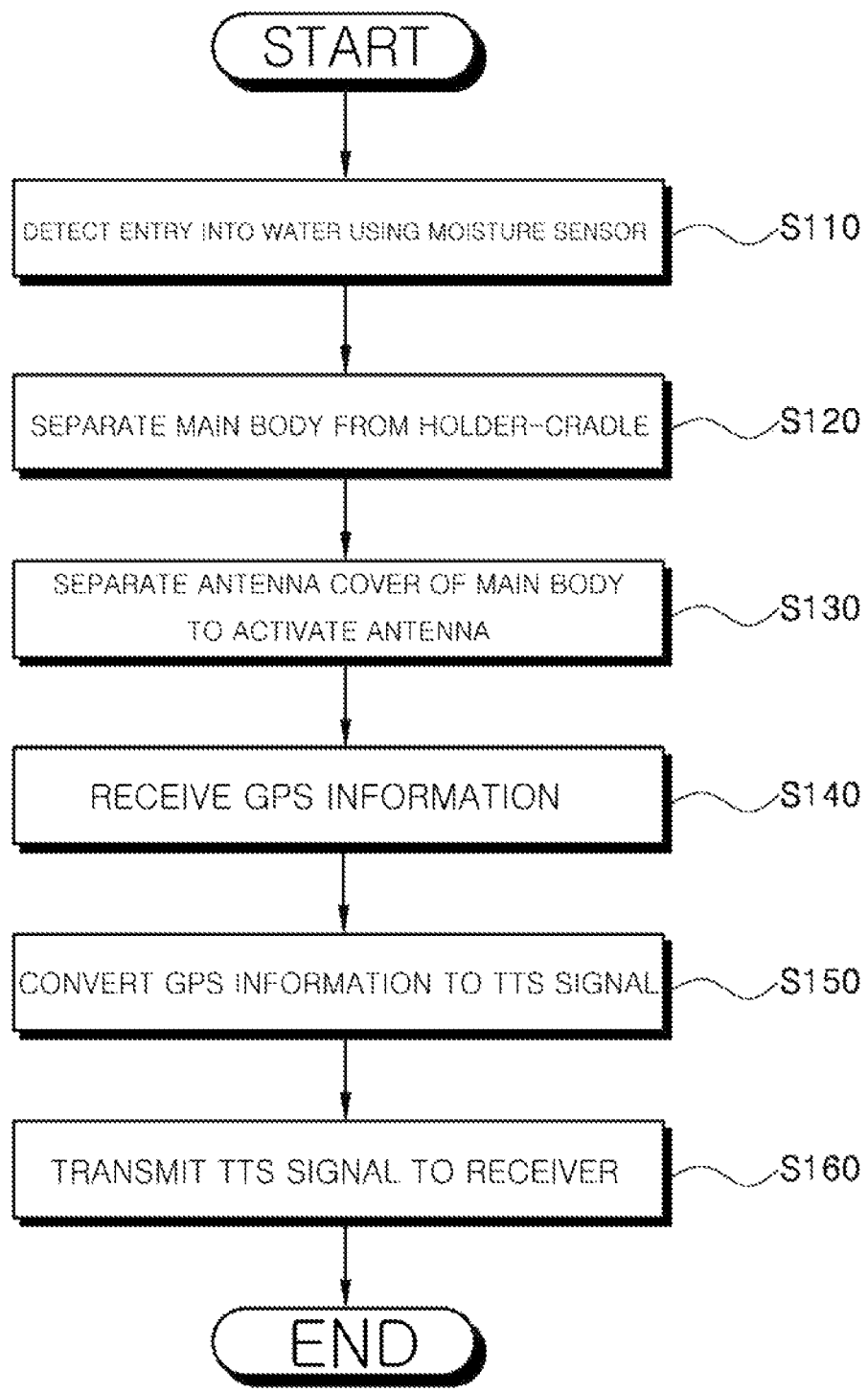
FIG. 8 is a flowchart illustrating a method of transmitting a maritime distress signal according to the embodiment of the present invention.

FIG. 8 is a flowchart illustrating a method of transmitting a maritime distress signal according to the embodiment of the present invention, and the method of transmitting a maritime distress signal first includes, detecting, by the moisture sensor 211 provided in the main body 200, entry into water (S110).

More preferably, the entry into water is determined according to the occurrence of a change in voltage of a drain of the transistor due to a change in voltage of the gate due to moisture, wherein the electrodes, which are in pairs of two electrodes, are connected to the gate of the high-impedance field effect transistor in order to easily detect sea water and fresh water, and the entry into water is determined by determining whether the number of electrodes having changed voltage values is maintained for a predetermined period according to a reference of the preset number of electrodes.

In this case, when the entry into water is determined by only water coming into contact with the moisture sensor 211, since water entry may be determined even by contamination by a liquid caused by deficient waterproofing or carelessness, the reference is set to prevent malfunctions.

More preferably, the moisture sensor 211 of the present invention determines entry into water using a voltage changed at a drain pin of the transistor through the gate of the field effect transistor connected to the electrodes which are in pairs of two opposite high-impedance electrodes, wherein the entry into water is determined by providing the plurality of electrodes and determining holding periods of signals changed at the same time according to a preset holding period of a signal.

For example, in the embodiment of the present invention, four pairs of electrodes are provided in the main body 200, more preferably, two pairs thereof are provided on each of an upper end and a lower end, and entry into water is determined when, among electrodes, resistance values of at least three pairs of the electrodes are changed and the changed resistance values are maintained for ten seconds which is a preset time period.

The reason for setting the time period is to prevent the separation part 300 from being driven when the maritime distress signal transmission device is falls into water for a short time period due to carelessness and is immediately taken out off the water because the holding period is not exceeded.

In addition, in the embodiment of the present invention, according to a situation in which there is a long period of non-use due to the nature of the device, a lithium-based primary battery having an extremely low self-discharge rate is used for the battery to perform a function even after several years have passed, and in order to form an ultra-low power circuit and to activate the moisture sensor 211 normally, a low power sensor circuit is formed to activate the moisture sensor 211 normally so that the moisture sensor 211 may be driven.

Then, when the moisture sensor 211 determines entry into water, the motor 310 of the separation part 300 is driven to separate the main body 200 from the holder-cradle 100 (S120).

Although the holder-cradle 100 is installed on the life jacket of a person in distress using the elastic metal clip and holds the main body 200, when the main body 200 enters the water with a rescuer and located in the water, the antenna is spread out in the sea water (salt water) in a low resistance state, and thus a problem occurs in that communication of a rescue signal is difficult. Accordingly, the main body 200 is separated from the holder-cradle 100 and floats on the sea while a predetermined distance is maintained therebetween through a thin and tough wire.

The main body 200 is separated as follows. The motor 310 provided in the main body 200 is driven to rotate the pinion gear 320 driven by the motor 310, the rack gear rail 330 which is moved in one direction by the rotation of the pinion gear 320 is moved, the holder-cradle 100 coupled to the double coupling part 340 is separated therefrom, and in the embodiment of the of the present invention, the elastic member 212 having a force for pushing out the holder-cradle 100 is formed on the rear surface of the main body 200 coupled to the holder-cradle 100, and when the holder-cradle 100 coupled to the double coupling part 340 is separated therefrom, the holder-cradle 100 is pushed out from the main body 200 by the elastic member 212 so that the main body 200 is easily separated from the holder-cradle 100.

In this case, in the embodiment of the present invention, although the elastic member is provided on the main body 200, the elastic member may be positioned inside the holder-cradle 100 coupled to the main body 200.

In addition, a buoyancy member may be provided in the accommodation part of the main body housing 210 of the main body 200 or provided at left and right side surfaces of the main body housing 210 so that the main body 200 may float, the battery is provided in a lower portion of the accommodation part of the main body housing 210 so that a weight is generated at the lower portion, and thus the main body 200 is not turned upside down so that the main body 200 floats on the water while the rear surface is submerged in water.

In this case, the buoyancy member may be provided to extend outside the main body housing.

In addition, since the holder-cradle 100 and the main body 200 are connected through the thin and tough wire, the main body 200 is positioned around the holder-cradle 100 even when the double coupling part 340 of the separation part 300 and the second hooking hole 140 of the holder-cradle 100 are separated from each other and the main body 200 floats on a water surface.

Then, the motor 310 of the separation part 300 is driven to separate the antenna cover 230 and activate the antenna 222 (S130).

In this case, since the antenna cover 230 is coupled to the double coupling part 340 of the separation part 300 in a form which is the same as that applied to the holder-cradle 100, like the separation of the holder-cradle 100, the motor 310 is driven to rotate the pinion gear 320 driven by the motor 310, the rack gear rail 330, which is moved by the rotation of the pinion gear 320, is moved, and thus the antenna cover 230 coupled to the double coupling part 340 is separated therefrom.

In this case, the antenna 222 is spread out in an upward direction.

Due to the separation of the antenna cover 230, the antenna 222 provided on the upper end of the main body 200 protrudes from the sea to improve communication sensitivity.

As described above, the holder-cradle 100 and the antenna cover 230 are separated using one motor 310, wherein the holder-cradle 100 and the antenna cover 230 may be sequentially separated or may be separated at the same time.

In the embodiment of the present invention, the first coupling part 341 of the double coupling part 340 to which the holder-cradle 100 is coupled is positioned more inward than the second coupling part 342 to which the antenna cover 230 is coupled, the holder-cradle 100 disposed at the inner side is separated by the rack gear rail 330 first, and the antenna cover 230 is separated sequentially, but when the first coupling part 341 and the second coupling part 342 are colinearly positioned, the holder-cradle 100 and the antenna cover 230 may be separated at the same time.

As described above, since the holder-cradle 100 is separated from the main body 200 to float the main body 200 and the antenna cover 230 is separated from the main body 200 to activate the antenna 222 using one separation part 300, a size of the transmission device can be reduced, battery power consumption can be reduced, and thus there is an effect in that a rescue signal transmission period can be increased.

Then, the antenna 222 is activated, the GPS receiver 215 receives GPS information which is a present position of the person in distress through the GPS antenna (not shown) (S140).

Then, digital syllable information is combined according to the received GPS information and is converted to a TTS voice signal (S150).

In this case, the TTS voice signal is converted by combining preregistered digital syllable information as digital syllable information according to the received GPS information, and the TTS voice signal includes any one or more among emergency situation information, a GPS location of the person in distress, a movement speed of the person in distress, a movement direction, a distress occurrence time, and water temperature information.

In addition, the TTS voice signal may also be converted and transmitted as one or more voice messages among a first phrase to a third phrase in the following Table 1.

TABLE 1

| Paragraph | Information |
| --- | --- |
| First Phrase | "SOS" + Longitude + Latitude |
| Second Phrase | Movement Speed + Movement Direction |
| Third Phrase | Distress Occurrence Time + Present Water Temperature |

For example, in a case in which a longitude and a latitude of the first phrase are 4250.5589, S, 14718.5084, E, the case is converted to the form like "SOS^south^four two five zero dot^five five eight nine^east^one four seven one eight dot^-five zero eight four," in a case in which a movement speed is 1.21 knots and a movement direction is 89.68 degrees in the second phrase, the case is converted to the form like "floating^one dot^two one^knots to^eight nine dot^six eight degrees," and in a case in which a distress time is Sep. 18, 2018 13:27:45 and a water temperature is 13.5° C. in the third phrase, the case is converted by combining digital syllable information such as "distresset^september eighteen on^thirteen twenty seven forty five^water temp^thirteen dot^-five." As a digital signal is transmitted as an analog voice signal, even when some middle part of a signal is disconnected, information is clearly transmitted so that the position of the person in distress can be indicated.

Finally, the TTS voice signal is transmitted to arbitrary remote receivers using the same frequency band through the wireless transmitter using a preset frequency band (S160).

Here, the receivers are located on nearby vessels and at nearby rescue stations, and a common frequency allowing rescue using rescue dedicated radio channel 16 in a very high frequency (VHF) band of an ITU international standard in which a marine walkie talkie may be used is used as the preset frequency band in the embodiment of the present invention.

That is, the receiver is essentially installed or located in each of all nearby vessels, base stations, and rescue stations as an international standard for maritime rescue.

Although the TTS voice signal transmitted to the receiver may be set to be repeatedly transmitted once every preset period to increase a lifetime of the battery and to transmit the TTS voice signal for a long time, the TTS voice signal may be manually transmitted by the person in distress.

In addition, when the main body 200 floats on the sea, the brightness sensor 223 detects ambient brightness, and when the brightness is less than or equal to a preset brightness, the maritime distress signal transmission device may also be visually indicated through the high-brightness light emitting part 224.

In the case of maritime rescue, it becomes difficult to search for the person in distress when it becomes dark, and thus the position of the person in distress may be indicated by emitting light even when the surroundings become dark.

Accordingly, the present invention has an effect in that the maritime distress signal transmission device is automatically driven to transmit a rescue signal when it is detected that a person in distress has entered the water regardless of a manual operation of the person in distress.

In addition, in the present invention, since one motor is used to separate the holder-cradle and the antenna cover, a size of the distress signal transmission device can be reduced, battery consumption can be reduced, and thus there is an effect in that a transmission period of a rescue signal can be increased.

In addition, in the present invention, since the holder-cradle and the main body are separated by the separation part and the antenna cover is separated, the main body floats on a water surface, the antenna is activated, and thus there is an effect in that communication sensitivity is improved.

In addition, in the present invention, since a rescue request signal for rescue and a plurality of necessary signals mainly including precise location information based on GPS satellites are converted to TTS syllable signals and the TTS syllable signals are transmitted to a receiver using a frequency band of a global standard for maritime emergency rescue used, there is an effect of clearly recognizing signal information and rapid rescuing.

The embodiments according to the present invention have been described above but are only exemplary, and it will be understood by those skilled in the art that various modifications and other equivalent embodiments may be made therefrom. Therefore, the scope of the present invention will be defined by the appended claims.

The invention claimed is:

1. A maritime distress signal transmission device comprising:
 a holder-cradle; and
 a main body which is coupled to the holder-cradle and transmits a rescue signal to an arbitrary receiver using a preset frequency band,
 wherein the main body includes a main body housing which includes a moisture sensor disposed on a rear surface thereof and configured to detect entry into water and in which a Global Positioning System (GPS) receiver configured to receive GPS signals, and a time to speech (TTS) signal convertor configured to convert the GPS signals to a TTS voice signal, a main body cover which covers an upper surface of the main body housing to perform a waterproofing function of preventing water from being introduced thereinto and accommodates an antenna which is disposed on an upper surface and transmits the TTS voice signal through a preset frequency band, and an antenna cover which hides and protects the antenna accommodated in the main body cover and in which a first hooking hole is formed in a direction perpendicular to an extension part formed by extending one side of the antenna cover,
 the holder-cradle allows the main body to be seated thereon and includes a second hooking hole is formed upward at one side thereof,
 a separation part including a double coupling part in which a first hooking part to which the first hooking hole of the antenna cover is coupled, a second hooking part to which the second hooking hole of the holder-cradle is coupled, and a rack gear rail which is moved in one direction by operation of a pinion gear connected to a motor provided in the accommodation part of the main body housing are formed and which is moved in the one direction according to operation of the rack gear to separate the holder-cradle and the antenna cover is provided,
 the holder-cradle and the antenna cover, which are coupled to the double coupling part, are sequentially separated according to detection of the moisture sensor to float the main body on a water surface, and
 the TTS voice signal is wirelessly transmitted as a signal in a preset frequency band to an arbitrary remote receiver through the antenna protruding upward due to the separation of the antenna cover.

2. The maritime distress signal transmission device of claim 1, wherein:
 the moisture sensor is arranged as a plurality of moisture sensors; and
 the entry into water is detected through an abnormal signal which is generated for a preset time period or more.

3. The maritime distress signal transmission device of claim 1, wherein:
 the holder-cradle and the main body are connected by a wire; and
 even when the double coupling part and the second hooking hole of the holder-cradle are separated, the main body is located near the holder-cradle in a state in which the connection of the wire is maintained.

4. The maritime distress signal transmission device of claim 1, wherein an elastic member, which allows the main body and holder-cradle to push against each other so that the main body and holder-cradle are easily separated from each other, is provided on the rear surface of the main body housing or on an upper surface of the holder-cradle.

5. The maritime distress signal transmission device of claim 1, wherein the TTS signal convertor combines pre-registered digital syllable information according to the received GPS signals to convert the digital syllable information to the TTS voice signal.

6. The maritime distress signal transmission device of claim 1, wherein the TTS voice signal includes any one or more among emergency situation information, a movement direction, a distress occurrence time, and water temperature information.

7. The maritime distress signal transmission device of claim 1, wherein, in the separation part:
 an elastic cover formed of a urethane material or the like to prevent water from being introduced into the main body housing through a through hole, through which the rack gear rail moves, of the main body housing is provided;
 the rack gear rail and the double coupling part are coupled with the elastic cover interposed therebetween; and
 the double coupling part is moved while the elastic cover is stretched according to the movement of the rack gear rail.

8. The maritime distress signal transmission device of claim 1, wherein the main body cover further includes:
 a brightness sensor which detects brightness; and
 a high-brightness light emitting part which emits light according to the brightness sensor.

9. A method of transmitting a maritime distress signal, which is performed by a device including a holder-cradle and a main body which is coupled to the holder-cradle and transmits a rescue signal to an arbitrary receiver using a preset frequency band, the method comprising:
 (a) detecting, by a moisture sensor of the main body, entry into water;
 (b) separating, by driving a motor, the main body from the holder-cradle when entry into water is detected;
 (c) opening an antenna cover which hides an antenna to activate the antenna, which has been hidden, using the motor when the main body is separated;
 (d) receiving Global Positioning System (GPS) information when the antenna is activated;
 (e) combining digital syllable information according to the GPS information to convert to a TTS voice signal; and
 (f) transmitting the TTS voice signal to the arbitrary remote receiver.

10. The method of claim 9, wherein in operation (a), the entry into water is determined according to occurrence of a change in voltage of a drain of a component due to a change in voltage of a gate due to moisture, wherein electrodes, which are in pairs of two electrodes, are connected to the gate of a high-impedance field effect transistor in order to easily detect sea water and fresh water, and the entry into water is determined by determining whether the number of electrodes having changed voltage values is maintained for a predetermined period according to a reference of a preset number of electrodes.

11. The method of claim 9, wherein:
 operations (b) and (c) are performed by one motor; and
 the holder-cradle and the antenna cover are sequentially separated or are separated at the same time according to a movement distance of a rack gear rail coupled to a pinion gear, which is rotated by driving of the motor, and moved in one direction by operation of the pinion gear.

12. The method of claim 9, wherein in operation (f), the receiver is essentially installed or located in each of all nearby vessels, base stations, and rescue stations according to an international standard for maritime rescue.

* * * * *